US012696152B2

(12) United States Patent
Kazmi et al.

(10) Patent No.: US 12,696,152 B2
(45) Date of Patent: Jul. 28, 2026

(54) COMMUNICATION DEVICE MEASUREMENT AND REPORT FOR PATTERN RECOGNITION OF PERIODIC RESOURCE AVAILABILITY FOR EXTENDED REALITY MOBILITY

(71) Applicant: Telefonaktiebolaget LM Ericsson (publ), Stockholm (SE)

(72) Inventors: Muhammad Ali Kazmi, Sundbyberg (SE); Jose Luis Pradas, Stockholm (SE); Du Ho Kang, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 18/272,426

(22) PCT Filed: Jan. 14, 2022

(86) PCT No.: PCT/IB2022/050305
§ 371 (c)(1),
(2) Date: Jul. 14, 2023

(87) PCT Pub. No.: WO2022/153240
PCT Pub. Date: Jul. 21, 2022

(65) Prior Publication Data
US 2024/0080728 A1      Mar. 7, 2024

Related U.S. Application Data

(60) Provisional application No. 63/138,223, filed on Jan. 15, 2021.

(51) Int. Cl.
*H04W 36/00* (2009.01)
*H04W 36/22* (2009.01)
*H04W 36/30* (2009.01)

(52) U.S. Cl.
CPC ....... *H04W 36/0085* (2018.08); *H04W 36/22* (2013.01); *H04W 36/302* (2023.05)

(58) Field of Classification Search
CPC . H04W 24/08; H04W 24/10; H04W 36/0085; H04W 36/22; H04W 36/302; H04W 48/12
See application file for complete search history.

(56) References Cited

U.S. PATENT DOCUMENTS

| | | | | |
|---|---|---|---|---|
| 10,244,433 B2 * | 3/2019 | Nenner | ............... | H04W 36/302 |
| 11,039,340 B2 * | 6/2021 | Pettersson | ............. | H04W 24/10 |

(Continued)

FOREIGN PATENT DOCUMENTS

| | | |
|---|---|---|
| KR | 101714592 B1 | 3/2017 |

OTHER PUBLICATIONS

Kwon et al. U.S. Appl. No. 63/008,583, filed Apr. 10, 2020 (Year: 2020).*

(Continued)

*Primary Examiner* — Wutchung Chu
(74) *Attorney, Agent, or Firm* — Sage Patent Group

(57) ABSTRACT

A communication device can obtain a traffic pattern of a cell by measuring a signal of the cell and/or by receiving the information about the traffic pattern from the cell. The communication device can further use the traffic pattern to perform one or more operational tasks.

20 Claims, 14 Drawing Sheets

(56) References Cited

U.S. PATENT DOCUMENTS

| | | | | |
|---|---|---|---|---|
| 2006/0063521 | A1* | 3/2006 | Cheung | H04L 41/06 |
| | | | | 455/423 |
| 2007/0275729 | A1* | 11/2007 | Kashima | H04W 16/02 |
| | | | | 455/450 |
| 2012/0252455 | A1* | 10/2012 | Martin | H04W 36/0094 |
| | | | | 455/436 |
| 2013/0083713 | A1* | 4/2013 | Johansson | H04W 52/0254 |
| | | | | 370/329 |
| 2013/0084869 | A1* | 4/2013 | Johansson | H04W 36/324 |
| | | | | 455/436 |
| 2014/0092733 | A1* | 4/2014 | Johansson | H04W 52/0225 |
| | | | | 370/328 |
| 2015/0045024 | A1 | 2/2015 | Lunden et al. | |
| 2015/0189529 | A1 | 7/2015 | Siomina et al. | |
| 2016/0029250 | A1* | 1/2016 | Yi | H04W 28/16 |
| | | | | 370/329 |
| 2017/0332284 | A1* | 11/2017 | Nenner | H04W 36/0016 |
| 2018/0288702 | A1 | 10/2018 | Kang et al. | |
| 2019/0141538 | A1* | 5/2019 | Jones | H04W 72/30 |
| 2020/0260469 | A1 | 8/2020 | Sirkka et al. | |
| 2020/0267640 | A1 | 8/2020 | Choe et al. | |
| 2021/0321480 | A1* | 10/2021 | Kwon | H04W 72/23 |
| 2022/0174111 | A1* | 6/2022 | Lopez Mendez | H04L 67/568 |
| 2022/0394076 | A1* | 12/2022 | Willars | H04W 28/06 |
| 2023/0217358 | A1* | 7/2023 | Tinnakornsrisuphap | |
| | | | | H04L 5/0051 |
| | | | | 370/329 |
| 2024/0080728 | A1* | 3/2024 | Kazmi | H04W 36/22 |

OTHER PUBLICATIONS

International Search Report and Written Opinion of the International Searching Authority, PCT/IB2022/050305, mailed Apr. 12, 2022, 16 pages.

Vivo, "Discussion on XR applications, traffic model and evaluation methodologies," 3GPP TSG RAN WG1 #103-e, R1-2007698, e-Meeting, Oct. 26-Nov. 13, 2020, 20 pages.

Qualcomm, "New SID on XR Evaluations for NR," 3GPP TSG RAN Meeting #86, RP-193241, Sitges, Spain, Dec. 9-12, 2019, 6 pages.

* cited by examiner

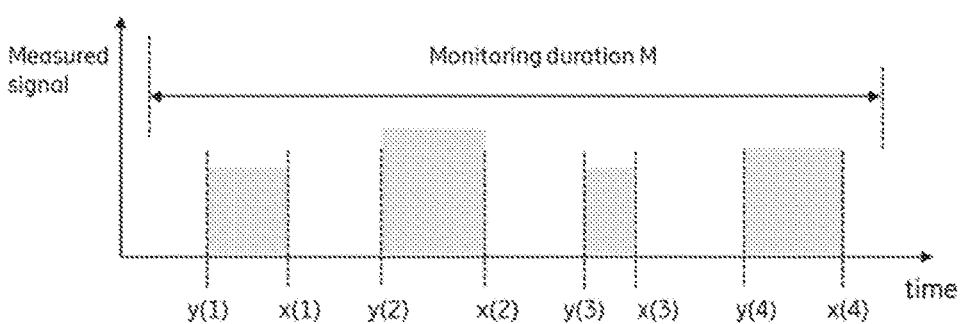

FIG. 6

| Obtain a traffic pattern of a cell by measuring a signal of the cell and/or by receiving the information about the traffic pattern from the cell     702 |
|---|

↓

| Use the obtained traffic pattern of the cell for performing one or more operational tasks     704 |
|---|

↓

| Obtain the traffic pattern of a plurality of target cells to detect a periodic traffic pattern of the target cell     706 |
|---|

↓

| Determine if the target cell has periodical resource availability based on a function of time instances of signal drop or rise     708 |
|---|

↓

| Transmit information about the traffic pattern to a network node that is configured to perform a cell change responsive to the traffic pattern     710 |
|---|

↓

| Receive traffic pattern information from a target cell that broadcasts the traffic pattern information     712 |
|---|

↓

| Acquire and report a status of traffic type in a cell on which the UE performs a measurement     714 |
|---|

↓

| Acquire and report status of only specific traffic types in a cell for which the UE meets reporting condition     716 |
|---|

FIG. 7

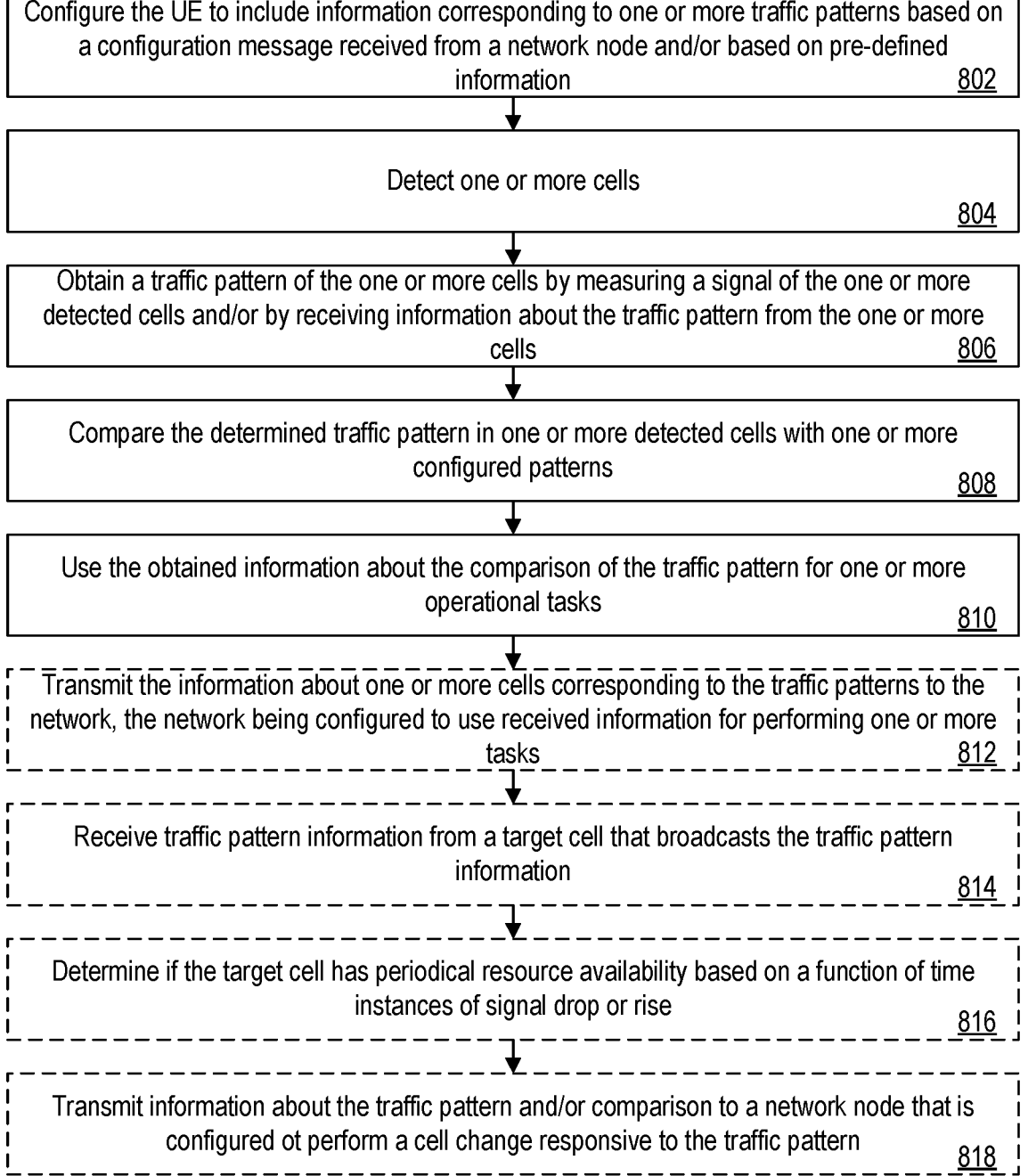

Configure the UE to include information corresponding to one or more traffic patterns based on a configuration message received from a network node and/or based on pre-defined information                                                                                                                                              802

Detect one or more cells                                                                                                                                              804

Obtain a traffic pattern of the one or more cells by measuring a signal of the one or more detected cells and/or by receiving information about the traffic pattern from the one or more cells                                                                                                                                              806

Compare the determined traffic pattern in one or more detected cells with one or more configured patterns                                                                                                                                              808

Use the obtained information about the comparison of the traffic pattern for one or more operational tasks                                                                                                                                              810

Transmit the information about one or more cells corresponding to the traffic patterns to the network, the network being configured to use received information for performing one or more tasks                                                                                                                                              812

Receive traffic pattern information from a target cell that broadcasts the traffic pattern information                                                                                                                                              814

Determine if the target cell has periodical resource availability based on a function of time instances of signal drop or rise                                                                                                                                              816

Transmit information about the traffic pattern and/or comparison to a network node that is configured ot perform a cell change responsive to the traffic pattern                                                                                                                                              818

FIG. 8

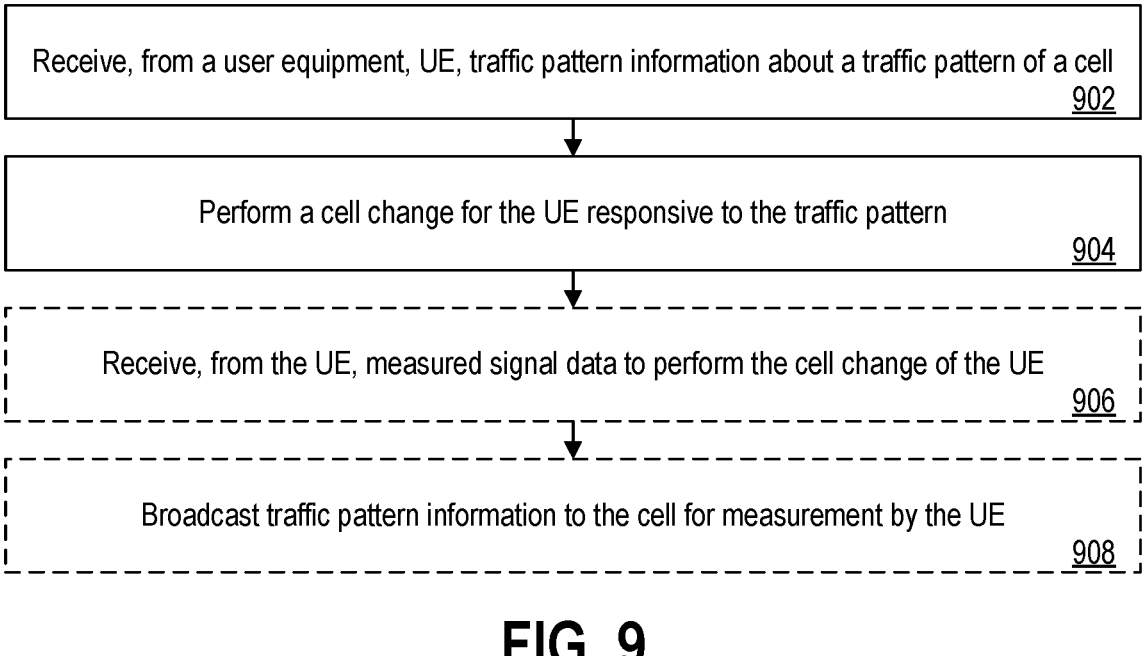

Receive, from a user equipment, UE, traffic pattern information about a traffic pattern of a cell
902

Perform a cell change for the UE responsive to the traffic pattern
904

Receive, from the UE, measured signal data to perform the cell change of the UE
906

Broadcast traffic pattern information to the cell for measurement by the UE
908

FIG. 9

Determine traffic pattern of one or more cells
1001

Transmit a configuration message to a user equipment, UE, that includes information corresponding to one or more traffic patterns
1002

Use traffic pattern information for one or more operational tasks
1004

FIG. 10

| Pattern ID | Periodical resource availability | available idle interval threshold Z | Number of idle interval N during a unit time |
|---|---|---|---|
| 0 | NO | N/A | N/A |
| 1 | YES | 0.2 ms | 30 |
| 2 | YES | 0.5 ms | 60 |
| ... | ... | ... | ... |
| | | | |

FIG. 11

| Traffic Type ID | Traffic Type | Traffic type supported (Yes/ NO = 1/0) |
|---|---|---|
| 0 | Type #1 | 1 |
| 1 | Type #1 | 0 |
| ... | ... | ... |
| N | Type #N | 0 |

FIG. 12

| Traffic Type ID | Traffic Type | Traffic type supported (Yes/ NO = 1/0) |
|---|---|---|
| 0 | VR | 0 |
| 1 | AR | 1 |

FIG. 13

| Traffic Type ID | Traffic Type | Traffic type supported (Yes/ NO = 1/0) |
|---|---|---|
| 0 | Low-end VR | 1 |
| 1 | High-end VR | 0 |
| 2 | Low-end AR | 1 |
| 3 | High-end AR | 0 |

Figure 17:
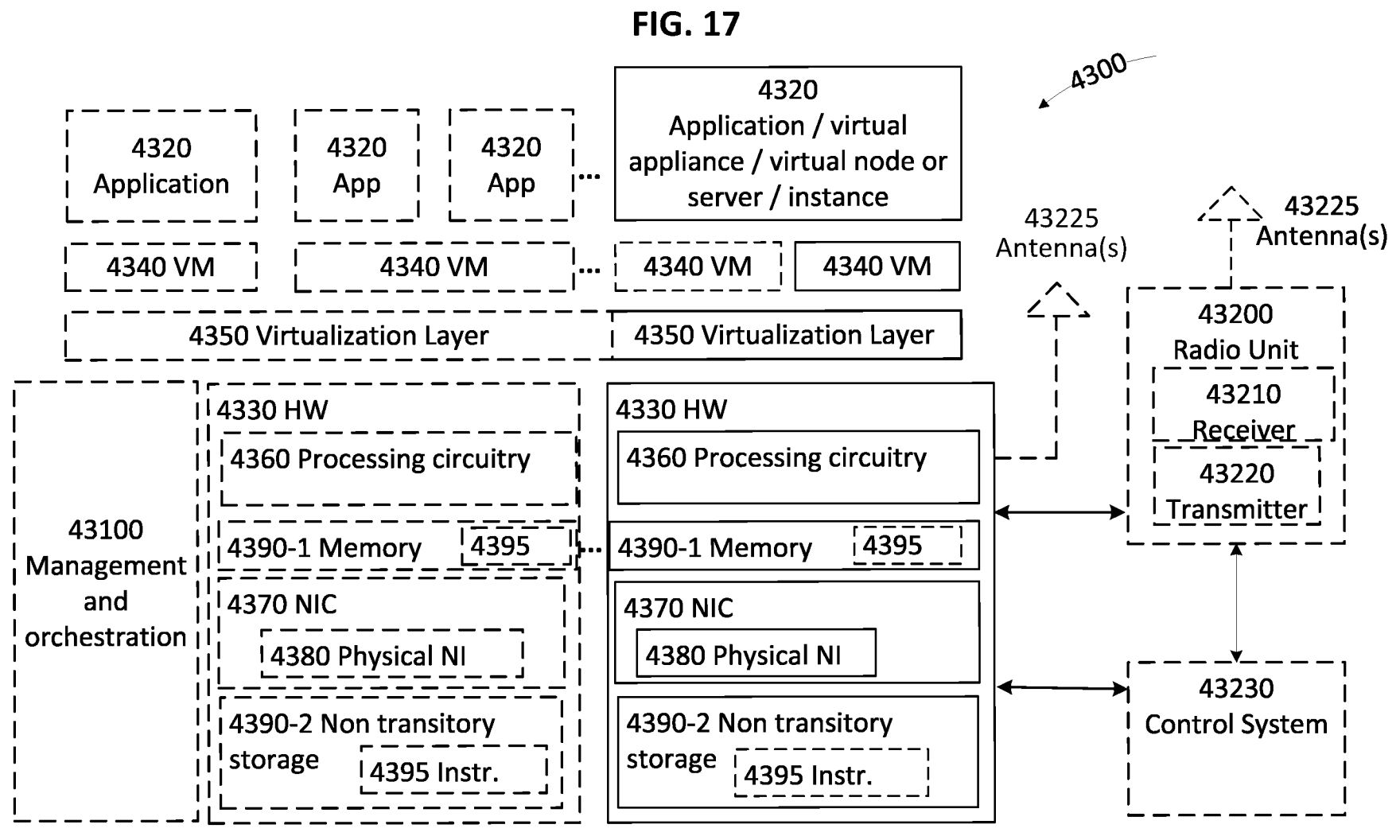

43225 Antenna(s)

43200 Radio Unit
43210 Receiver
43220 Transmitter

43230 Control System

43225 Antenna(s)

4320 Application / virtual appliance / virtual node or server / instance

4340 VM

4350 Virtualization Layer

4330 HW
4360 Processing circuitry
4390-1 Memory
4395
4370 NIC
4380 Physical NI
4390-2 Non transitory storage
4395 Instr.

4320 Application
4340 VM

4320 App
4340 VM

4320 App

4350 Virtualization Layer

4330 HW
4360 Processing circuitry
4390-1 Memory
4395
4370 NIC
4380 Physical NI
4390-2 Non transitory storage
4395 Instr.

43100 Management and orchestration

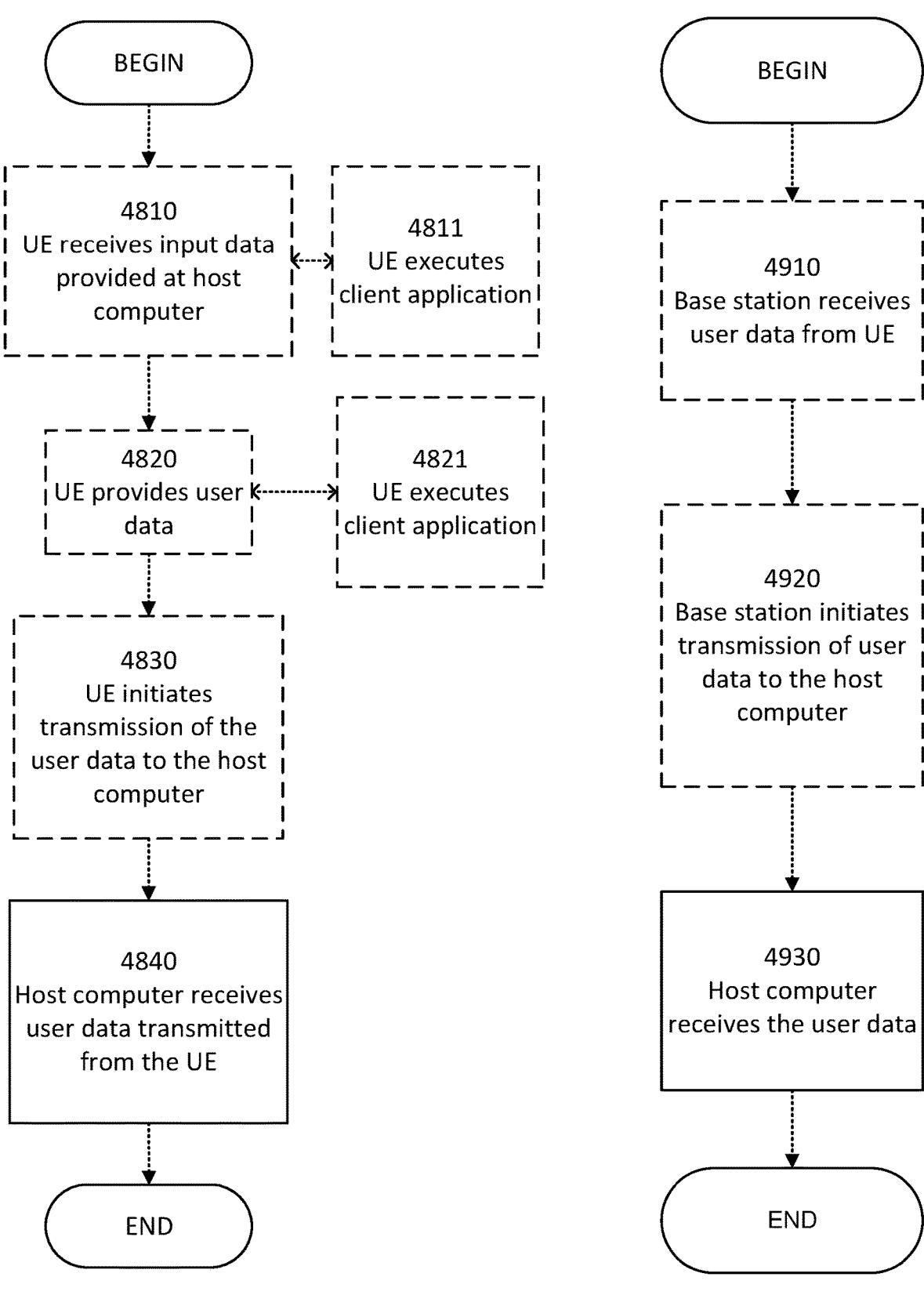
FIG. 22                    FIG. 23

COMMUNICATION DEVICE MEASUREMENT AND REPORT FOR PATTERN RECOGNITION OF PERIODIC RESOURCE AVAILABILITY FOR EXTENDED REALITY MOBILITY

CROSS REFERENCE TO RELATED APPLICATIONS

This application is a 35 U.S.C. § 371 national stage application of PCT International Application No. PCT/IB2022/050305 filed on Jan. 14, 2022, which in turn claims domestic priority to U.S. Provisional Patent Application No. 63/138,223, filed on Jan. 15, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

FIG. 1 illustrates an example of a 5th Generation ("5G") network (also referred to as a new radio ("NR") network) including a pair of network nodes 110a-b (e.g., 5G base stations ("gNB")) and multiple communication devices 120 (also referred to as user equipment ("UE")).

5G is the fifth-generation of mobile communications, addressing a wide range of use cases from enhanced mobile broadband ("eMBB") to ultra-reliable low-latency communications ("URLLC") to massive machine type communications ("mMTC"). 5G includes the New Radio ("NR") access stratum interface and the 5G Core Network ("5GC"). The NR physical and higher layers are reusing parts of the long term evolution ("LTE") specification, and to that add needed components when motivated by new use cases.

Low-latency high-rate applications such as extended Reality ("XR") and cloud gaming are important in 5G era. XR may refer to all real-and-virtual combined environments and human-machine interactions generated by computer technology and wearables. It is an umbrella term for different types of realities including Virtual reality ("VR"), Augmented reality ("AR"), Mixed reality ("MR"), and the areas interpolated among them. The levels of virtuality range from partially sensory inputs to fully immersive VR.

SUMMARY

Embodiments are directed to methods of operating a user equipment, UE, in a communication network. Operations of such methods include obtaining a traffic pattern of a cell by measuring a signal of the cell and/or by receiving the information about the traffic pattern from the cell and using the obtained traffic pattern of the cell for performing one or more operational tasks.

Embodiments are directed to methods of operating a user equipment, UE, in a communication network. Operations of such methods include configuring the UE to include information corresponding to one or more traffic patterns based on a configuration message received from a network node and/or based on pre-defined information, detecting one or more cells, obtaining a traffic pattern of the one or more cells by measuring a signal of the one or more detected cells and/or by receiving information about the traffic pattern from the one or more cells, comparing the determined traffic pattern in one or more detected cells with one or more configured patterns, and using the obtained information about the comparison of the traffic pattern for one or more operational tasks.

Embodiments are directed to methods of operating a network node in a communication network. Operations of such methods include receiving, from a user equipment, UE, traffic pattern information about a traffic pattern of a cell and performing a cell change for the UE responsive to the traffic pattern. Some embodiments provide that the traffic pattern of the cell is obtained by measuring a signal of the cell and/or receiving the traffic pattern information from the cell.

Embodiments are directed to methods of operating a network node in a communication network. Operations of such methods include transmitting a configuration message to a user equipment, UE, that includes information corresponding to one or more traffic patterns.

Advantages of embodiments herein include supporting more accurate cell reselection and HO for low-latency and periodic XR services requiring consistent short term bit rate and avoiding potential sudden latency increase by bad cell-reselection based on signal strength. This in turn reduces overhead and also leads to reduced processing in the BS and UE.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 6 is a block diagram illustrating an example of a core network ("ON") node (e.g., an access and mobility management function ("AMF") node or a session management function ("SMF") node) in accordance with some embodiments;

FIGS. 7-8 are a flow charts illustrating examples of operations of a UE in accordance with some embodiments;

FIGS. 9-10 are flow charts illustrating examples of operations of a network node in accordance with some embodiments;

FIG. 10 is a diagram illustrating an example of a measurement operation in accordance with some embodiments;

FIG. 11 is a table illustrating an example of a traffic pattern in accordance with some embodiments;

FIGS. 12-14 are tables illustrating examples of information indicating types of extended reality ("XR") traffic currently supported in a cell in accordance with some embodiments;

FIG. 17 is a block diagram of a virtualization environment in accordance with some embodiments;

FIG. 22 is a block diagram of methods implemented in a communication system including a host computer, a base station and a user equipment in accordance with some embodiments; and FIG. 23 is a block diagram of methods implemented in a communication system including a host computer, a base station and a user equipment in accordance with some embodiments.

DETAILED DESCRIPTION

Figure 1:
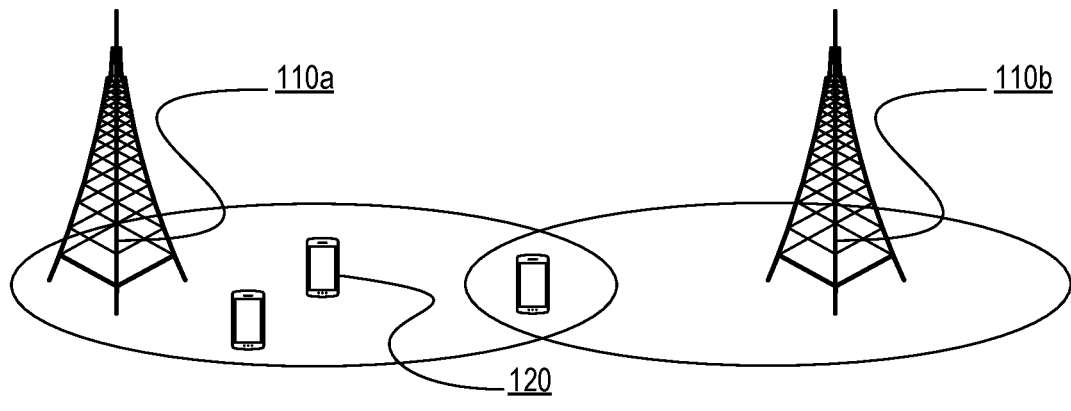
FIG. 1 is a schematic diagram illustrating an example of a wireless communications network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

5$^{th}$ Generation ("5G") new radio ("NR") is designed to support applications demanding high rate and low latency in line with the requirements posed by the support of extended reality ("XR") and cloud gaming applications in NR networks. Some objectives of 3GPP Release 17 are to identify the traffic model for each application of interest, the evaluation methodology and the key performance indicators of interest for relevant deployment scenarios, and to carry out performance evaluations accordingly in order to investigate possible standardization enhancements.

XR traffic can be periodic in terms of file arrival but its average data rate requirement and dominant transmission is dependent on sub-XR use cases. Depending on a specific sub-XR use cases, a different periodic radio transmission characteristic can be present which may potentially require a different cell or network operation. Two important aspects of differentiating XR use cases include data rate (e.g., high data rate (large resource availability) and low data rate (small resource availability) and dominant transmission direction (e.g., downlink transmission and uplink transmission).

Low-latency high-rate applications are described below.

The low-latency applications like XR and cloud gaming require bounded latency, not necessarily ultra-low latency. The end-to-end latency budget may be in the range of 20-80 ms, which needs to be distributed over several components including application processing latency, transport latency, radio link latency, etc. For these applications, short transmission time intervals ("TTIs") or mini-slots targeting ultra-low latency may not be effective.

Frame latency can be measured over a radio access network ("RAN"), excluding application & core network latencies. It can be seen that there exist frame latency spikes in RAN. The sources for the latency spikes may include queuing delay, time-varying radio environments, time-varying frame sizes, among others. Tools that can help to remove latency spikes are beneficial to enable better 5G support for this type of traffic. In some examples, the latency spike occurs due to instantaneous shortage of radio resources or inefficient radio resource allocation in response to varying frame size.

In addition to bounded latency requirements, the applications like XR and cloud gaming also require high rate transmission. This can be seen from the large frame sizes originated from this type of traffic. The typical frame sizes may range from tens of kilobytes to hundreds of kilobytes. The frame arrival rates may be 60 or 120 frames per second ("fps"). As a concrete example, a frame size of 100 kilobytes and a frame arrival rate of 120 fps can lead to a rate requirement of 95.8 Mbps.

A large video frame is usually fragmented into smaller IP packets and transmitted as several transport blocks ("TBs") over several TTIs in RAN. In some examples, a 5 TBs can be used for delivering frames with a size of 100 kilobyte ("KB").

UE measurements and reporting for cell change are described below.

The UE performs measurements on one or more reference signal ("RS") of one or more cells in radio resource control ("RRC") idle/inactive and RRC connected state. Cells may belong to the same or different carrier frequencies. Examples of RS are signals in a synchronization signal block ("SSB"), a channel state information reference signal ("CSI-RS"), a cell reference signal ("CRS"), a demodulation reference signal ("DMRS"), a primary synchronization signal ("PSS"), and a secondary synchronization signal ("SSS"). Examples of measurements are cell identification (e.g., physical cell identifier ("PCI") acquisition, cell detection), Reference Symbol Received Power ("RSRP"), Reference Symbol Received Quality ("RSRQ"), secondary synchronization ("SS")-RSRP, SS-RSRQ, signal-to-interference and noise ratio ("SINR"), RS-SINR, SS-SINR, CSI-RSRP, CSI-RSRQ, received signal strength indicator ("RSSI"), acquisition of system information ("SI"), cell global identifier ("CGI") acquisition, Reference Signal Time Difference ("RSTD"), UE receive ("RX")-transmit ("TX") time difference measurement, Radio Link Monitoring ("RLM"), which consists of Out of Synchronization (out of sync) detection and In Synchronization (in-sync) detection etc.

The UE can be configured by the network (e.g., via RRC message) with measurement configuration and measurement reporting configuration e.g., measurement gap pattern, carrier frequency information, types of measurements (e.g., RSRP etc), higher layer filtering coefficient, time to trigger report, reporting mechanism (e.g., periodic, event triggered reporting, event triggered periodic reporting etc.)

The UE after identifying a cell (e.g., cell detection or cell search) performs signal measurement (e.g., RSRP, RSRQ, SINR etc) periodically. Both cell detection and signal measurements are performed over their respective pre-defined or configurable measurement times. In case of periodic reporting the UE reports the measurement results for a cell with the configured periodicity e.g., once every 640 ms. In case of event triggered reporting the UE reports the measurement results for a cell only when the configured event is triggered e.g., when RSRP of that cell falls below certain threshold, when RSRP of that cell increases above certain threshold, when RSRP of that cell compared to RSRP of serving cell increases above certain threshold etc. Few examples of measurement reporting events in NR are listed below:

Event A1: Serving cell measurement becomes better than threshold

Event A2: Serving cell measurement becomes worse than threshold

Event A3: Neighbour cell measurement becomes offset better than SpCell

Event A4: Neighbour cell measurement becomes better than threshold

Event A5: SpCell measurement becomes worse than threshold1 and neighbour cell measurement becomes better than threshold2

Event A6: Neighbour cell measurement becomes offset better than secondary cell ("SCell"). Special cell ("SpCell") can be a primary cell ("PCell") or a primary secondary cell ("PSCell").

Figure 2:
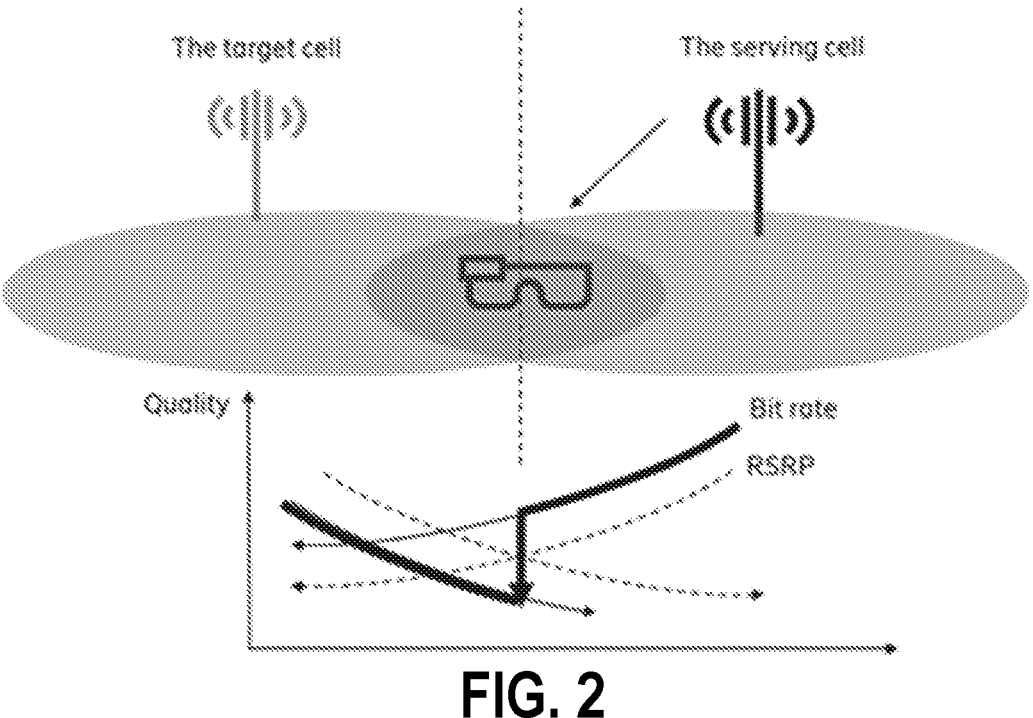
FIG. 2 is a schematic diagram illustrating an example of a problem of existing signal strength-based cell reselection, which can lead to significant mismatch between signal strength and actual bit rate from the target cell.

A problem of existing signal measurement (e.g., RSRP, RSRQ) based cell change (e.g., handover, cell reselection, RRC release with redirection, RRC re-establishment etc.) includes not providing sufficient information for XR traffic which requires periodic resource availability. For example, as shown in FIG. 2, there might be a case that a target cell provides sufficiently good RSRP but its limited resource availability due to congestion will give much worse bit rate after the cell change e.g., cell-reselection, handover etc. The target cell may also be called as a neighbor cell, candidate cell etc. i.e., cell which has potential of becoming new serving cell of the UE after the cell change. This will cause noticeable degradation of XR service quality which essentially requires constant bit rate before and after the cell change e.g., hand over ("HO"), cell reselection etc. In addition, the resource availability of target cell should include short-term information since XR is very delay sensitive. This means that high resource availability in average, e.g., average cell utilization, does not indicate that resource is always available whenever XR traffic periodically arrives.

Figure 3:
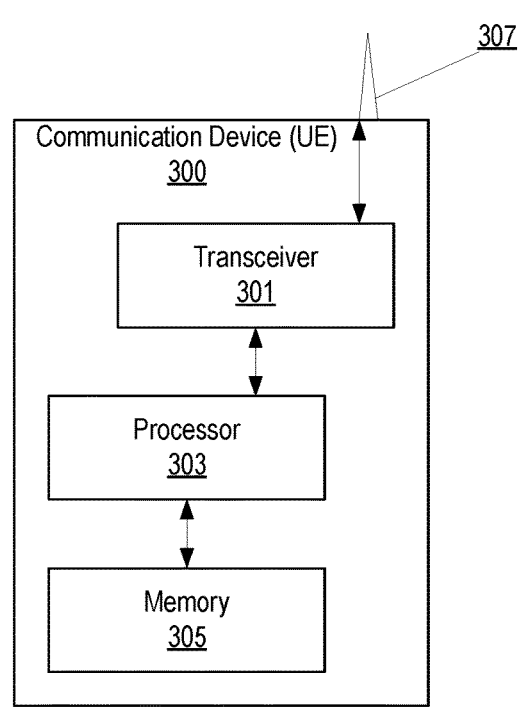
FIG. 3 is a block diagram illustrating elements of a communication device configured to provide wireless communication according to embodiments of inventive concepts.

Various embodiments herein may address additional UE measurements and the report of short-term available resource pattern FIG. 3 is a block diagram illustrating elements of a communication device 300 (also referred to as a mobile terminal, a mobile communication terminal, a wireless device, a wireless communication device, a wireless terminal, mobile device, a wireless communication terminal, user equipment ("UE"), a user equipment node/terminal/device, etc.) configured to provide wireless communication according to embodiments of inventive concepts. (Communication device 300 may be provided, for example, as discussed below with respect to wireless device 4110 of FIG. 15, UE 4200 of FIG. 16, UEs 4491, 4492 of FIG. 18, and/or UE 4530 of FIG. 19.) As shown, communication device UE may include an antenna 307 (e.g., corresponding to antenna 4111 of FIG. 15), and transceiver circuitry 301 (also referred to as a transceiver, e.g., corresponding to interface 4114 of FIG. 15) including a transmitter and a receiver configured to provide uplink and downlink radio communications with a base station(s) (e.g., corresponding to network node 4160 of FIG. 15, also referred to as a RAN node) of a radio access network. Communication device may also include processing circuitry 303 (also referred to as a processor, e.g., corresponding to processing circuitry 4120 of FIG. 15) coupled to the transceiver circuitry, and memory circuitry 305 (also referred to as memory, e.g., corresponding to device readable medium 4130 of FIG. 15) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device may also include an interface (such as a user interface) coupled with processing circuitry 303, and/or communication device may be incorporated in a vehicle.

As discussed herein, operations of communication device may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device 300 and/or an element(s)/function(s) thereof may be embodied as a virtual node/nodes and/or a virtual machine/machines.

Figure 4:
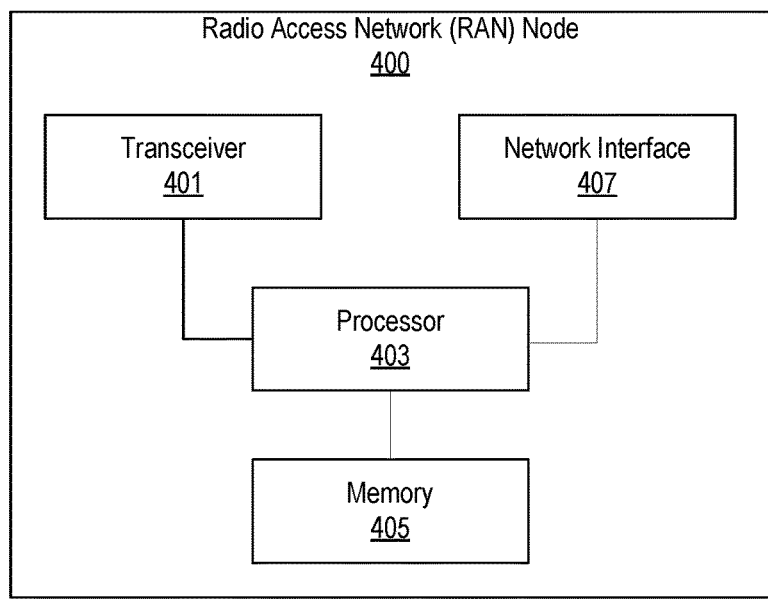
FIG. 4 is a block diagram illustrating an example of a communication device (also referred to herein as a user equipment ("UE") and/or a wireless device) in accordance with some embodiments.

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 15, base stations 4412a, 4412b, 4412c of FIG. 18, and/or base station 4520 of FIG. 19.) As shown, the RAN node may include transceiver circuitry 401 (also referred to as a transceiver, e.g., corresponding to portions of interface 4190 of FIG. 15) including a transmitter and a receiver configured to provide uplink and downlink radio communications with mobile terminals. The RAN node may include network interface circuitry 407 (also referred to as a network interface, e.g., corresponding to portions of interface 4190 of FIG. 15) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 15) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 5:
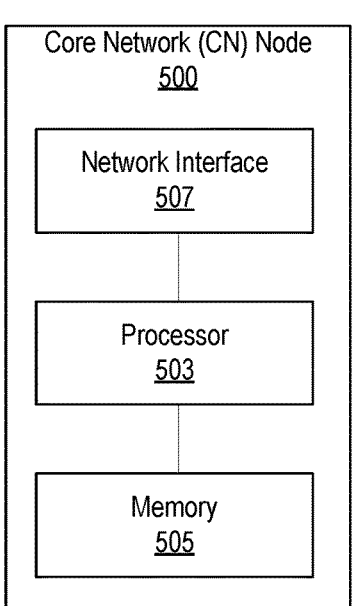
FIG. 5 is a block diagram illustrating an example of a radio access network ("RAN") node (e.g., a base station eNB/gNB) in accordance with some embodiments.

FIG. 5 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

In this disclosure, operations are provided for UE pattern recognition of periodic resource availability from the potential target cells and its report to a serving cell. Some embodiments provide that in the first embodiment a UE recognizes periodic idle time from a set of target cells and report its pattern information (e.g., identifier ("ID") of pre-defined pattern) to a network in order to find the best target cell that its periodic XR traffic can squeeze into both in terms of traffic pattern and amount of available time resource. The UE may also determine status of the traffic pattern in a target cell by acquiring its SI e.g., target cell transmits the traffic pattern status such as whether XR or certain type of XR in the cell is currently supported/available or not. The UE further transmits signal measurement results (e.g., RSRP, RSRQ, beam ID such as SSB index etc.) of the target cells along with the information about the traffic pattern in that cell. More specifically in this embodiment the UE reports measurement results (e.g., RSRP) and traffic pattern information of any cell which meets measurement reporting criteria (e.g., RSRP is above threshold). This means certain cell which meets reporting criteria may not be useful for cell change to the UE e.g., if its traffic pattern does not meet the UE service requirements. However, the measurement results and traffic pattern information for such cell can still be used by the BS for certain tasks e.g., for network planning, for cell change for other UEs etc.

In some embodiments, a UE is pre-configured with information (e.g., identifiers) about one or more traffic patterns (e.g., associated with or relevant for XR traffic) e.g., by the network node or based on pre-defined rule. The UE identifies or detects one or more target cells for mobility e.g., cell change, and further determines traffic pattern in the detected one or more cells. The UE transmits results of only those target cells whose traffic pattern(s) matches with any of the pre-configured traffic pattern. The UE may also determine status of the traffic pattern in a target cell by acquiring its SI e.g., target cell transmits the traffic pattern status such as whether XR or certain type of XR in the cell is currently supported/available or not. The UE may then compare the acquires status of the traffic pattern/type with one of the configured traffic patterns. The difference compared to embodiment #1, is that in embodiment #2, the UE reports measurement results (e.g., RSRP) of only relevant cells to the base station. The relevant cell herein means the one whose traffic pattern matches with any of the pre-configured traffic patterns and which meets measurement reporting criteria (e.g., RSRP is above threshold). This in turn reduces overheads and also lead to reduce processing in the BS and UE.

In both embodiments, a common feature is that the UE determines traffic pattern in target cells. Advantages of embodiments herein include supporting more accurate cell reselection and HO for low-latency and periodic XR services requiring consistent short term bit rate and avoiding potential sudden latency increase by bad cell-reselection based on signal strength.

Some embodiments are directed to UE measuring and reporting traffic pattern of target cell(s). In such embodiments, a UE measures the signal of one or a set of a target cells in order to detect and report its periodic pattern.

The periodic pattern is defined in a predetermined way and signaled by a RRC, e.g., a table for pattern ID and its properties. Examples of signals which UE can monitor for determining the pattern are one or more physical signals and/or physical channels (which carry higher layer information such as logical channel, data traffic, RRC messages etc.) Examples of physical signals are CSI-RS, time-frequency tracking signals, SSB, DMRS, PRS etc. Examples of physical channels are physical downlink shared channel ("PDSCH"), physical downlink control channel ("PDCCH"), physical broadcast channel ("PBCH"), control resource set ("CORSET"), system information blocks ("SIBs") etc. In one example the measured signal can be a signal strength (e.g., path loss, received power, RSRP etc.) In another example the measured signal can be a signal quality (e.g., SI NR, SNR, RSRQ, block error rate ("BLER"), bit error rate ("BER") etc.) For example, the signal strength and/or signal quality may be measured on any one or more physical signals and/or any one or more physical channels.

The UE determines the traffic pattern using one or more of the following mechanisms:

In one example the UE monitors a signal transmitted by a neighbor cell (e.g., target cell for cell change) during a certain duration M and, during M, a UE checks and records the time instances of $x(1)$, $x(2)$ . . . $x(n)$ whenever the measured signal level on a particular signal is dropped by at least HO (dBm or dB) below certain signal level threshold e.g., H1 dBm of signal strength or H2 dB of signal quality. Similarly, it also checks and records the time instance of $y(1)$, $y(2)$, . . . $y(n)$ whenever the measured signal level is increased by at least G0 (dB) above signal level threshold e.g., G1 dBm of signal strength or G2 dB of signal quality. This measurement operation and relation between $x(n)$, $y(n)$, M are shown in FIG. 6.

In FIG. 6, the UE may have to measure signal level more frequently in order to determine more accurately when the signal level drops below H1 by H0 dB or when the signal level rises above G1 by G0 dB. In another example the UE periodically monitors signal level of signals in a target cell and determines the time instances at which the signal level drops below H1 by H0 dB or when the signal level rises above G1 by G0 dB. The UE can be configured with the periodicity with which it shall measure the signal level based on pre-defined information and/or by receiving information from the network node. The UE may also be configured with plurality of periodicities (P1, P2, etc) at which it monitors the signal levels. For example, the UE may adapt the periodicity based on variation of signals e.g., signal activity level. In one example if the UE detects less than or equal to N1 number of low or high signal levels over the next T1 time resources (e.g., T1 slots/frames/seconds etc) then the UE may start monitoring the signal levels with longer periodicity (P2). As special case N1=0. In another example if the UE detects more than N1 number of low or high signal levels (or their changes) over the next T2 time resources (e.g., T2 slots/frames/seconds etc) then the UE may start monitoring the signal levels with shorter periodicity (P1); where P1<P2.

The parameters M, H0, H1, G0, G1, P1, P2, N1 etc can be pre-defined or configured by the network node.

The traffic pattern is determined by estimating a parameter D which is a function of the time instances of signal drop or rise: X and Y, where X and Y are vectors such as:

$$X=\{x(1),x(2), \ldots ,x(n),x(n+1), \ldots ,x(n+m)\}$$

$$Y=\{y(1),y(2), \ldots ,y(n), \ldots ,y(n),y(n+m)\}$$

Therefore, D related one or more elements of X with one or more elements of Y e.g.

$$D=f(Y,X)$$

For example, D may be used to determine idle time or time of low activity in a target cell when the UE can be served for XR traffic. This is explained with few examples below:

In one specific example of D, a UE estimates the idle interval D(n) in a cell when a UE can be served by that cell with XR traffic with acceptable quality after the cell change e.g., handover, i.e., $$\text{if } x(n)>y(n),D(n)=y(n+1)-x(n).$$

$$\text{Otherwise, } D(n)=y(n)-x(n).$$

Based on D(n), a UE determines if the target cell has periodical resource availability which indicates the target cell has a certain resource available periodically. This information may be needed to check if the target cell is suitable for future periodic allocation of resource for a new UE. If the variance of $x(n)$ is less than N2, it is determined that the target cell has that 'periodic resource availability' true. Then, two factors should be further computed to characterize the pattern: idle interval Z and the number of idle interval N during a time unit. For example, if the variance of D(n) is less than available idle interval threshold Z, it considers the target cell is available to serve a duration of Z. Then, a UE will further decide Z from D(n). Z can be the mean of D(n), the maximum or minimum value of D(n). The number of idle interval N is also calculated by the length of D(n) during a certain period of time.

In yet another example, the vector X and Y can be determined by monitoring one or more control channels (e.g., PDCCH, downlink control information ("DCI") etc.) transmitted by a target cell to its UEs. The control channel performs an allocation of resources to the UE e.g., for uplink ("UL") and/or downlink ("DL") scheduling of data. If the UE detects presence of the control channel then it assumes high signal level or high activity level in that target cell. But if the UE does not detect presence of the control channel then it assumes no or low signal level or low activity level in that target cell. The UE may further read the higher layer information of the control channel to determine the amount of time-frequency resources (e.g., resource blocks etc.) allocated to UEs in the target cell. The UE can collect such statistics over certain time period or time resources e.g., over L1 slots/frames, T3 time units etc. Based on these statistics the UE can determine whether the periodic resources are available in the target cell or not.

In yet another example a target cell may broadcast a traffic pattern information of the traffic pattern in that cell over the last T4 time period as shown in the table of FIG. 11. The cell may broadcast for example an identifier of pre-defined traffic pattern. In another example the cell may broadcast for example an indicator indicating whether that cell can support certain type of traffic and/or certain level of bit rate over the next T5 time resources. The UE may acquire the system information of that cell to determine the traffic pattern is that cell more explicitly.

As another non-limiting example, if time division duplex ("TDD") spectrum is used and a UE knows TDD pattern of the target cell, e.g., either RRC signaling from a serving cell for dynamic TDD or implicit assumption of the same TDD pattern as the target cell. In this case, a UE only estimates D(n) during the wanted transmission direction at given entire monitoring duration M.

In yet another example a target cell may broadcast a traffic pattern information (e.g., via system information (SI)) indicating which one or more types of XR traffic are allowed by the base station in a cell or not. The information may comprise for example identifiers of the traffic type and their status e.g., currently allowed or not allowed by the BS in a cell. As a non-limiting example, this information can be valid for given time e.g., currently or for the next T6 time units (e.g., Y1 seconds, Y2 frames, Y3 SFN cycles etc.) starting from a reference time (e.g., current time, from certain SFN etc.) The value of T6 can be pre-defined or can also be signaled to the UE e.g., via broadcast channel. The information can be transmitted by the BS in a broadcast channel via SI e.g., in a SIB such as in SI B1. The information can be transmitted periodically or aperiodically etc. An example illustrated in the table of FIG. 12, assumes there are N possible traffic types supported by the cell. However, at given time the cell may be able to support a subset of traffic types (e.g., only one or 2) or all traffic types. The table shows that the cell can support only traffic type #1 (indicated by 0). As special case N=1 e.g., only one traffic type corresponding to any type of XR traffic. In another example the BS may broadcast only information about traffic type which is supported. In this case the UE assumes that the traffic types whose information is not signaled is not supported. In another example the BS may broadcast only information about traffic type which is not currently supported. In this case the UE assumes that the traffic types whose information is not signaled is currently supported. The tables illustrated in FIGS. 13-14 give specific examples of signaling the XR traffic related information in the cell e.g., their ID and current status. The UE is configured to acquire and report the status of the traffic type in a cell (e.g., by acquiring the SI of that cell) on which the UE performs a measurement and meet reporting condition e.g., cell whose RSRP and/or RSRQ is above certain threshold. The UE may also be configured to acquire and report the status of only specific traffic types (e.g., type 2 in the table of FIG. 12) in a cell for which the UE meet reporting condition e.g., cell whose RSRP and/or RSRQ is above certain threshold. For example if a UE measurement signal level (e.g., RSRP) wrt target cell (e.g., cell2) is above certain threshold then the UE acquires the status of the traffic type by acquiring the SI of that cell and report the results e.g., signal level and also the status of all or requested traffic types.

The UE then transmits information about the determined traffic pattern (e.g., pre-defined ID of the pattern) for one or more target cells along with the measurement results (e.g., RSRP, RSRQ etc. measured by the UE on the cell) of those cells to the network node e.g., serving cell. The network node may use at least these two sets of information (e.g., traffic pattern information and measured signal levels) for performing cell change of the UE. For example, the network node may select a cell whose signal level is above certain threshold and which can guarantee that the traffic requirements of the UE are met e.g., meet XR service without interruption or with minimal interruption.

In other embodiments, a UE reports measurement for cells with acceptable traffic patterns.

In such embodiments, a UE is configured with information about one or more traffic patterns. The UE may be configured with information about one or more traffic patterns based on configuration message received by the network or based on pre-defined information. This explicit configuration by a network is beneficial to allow a UE better to predict a traffic pattern especially in downlink. For example, one or more traffic patterns can be pre-defined and the UE can be configured with their corresponding identifiers. For example pattern with ID #1 and with ID #2 may correspond to different types of XR services e.g., with different video quality levels.

The UE detects one or more target cells for cell change. The cell detection is based on the acquisition of the cell ID e.g., by acquiring PSS/SSS of the cell.

The UE further determines one or more cells out of the detected cells whose measured signal level (e.g., RSRP, RSRQ etc.) is above certain threshold (B1). In another example the UE further determines one or more cells out of the detected cells whose measured signal level (e.g., RSRP, RSRQ etc.) is at least B2 dB larger than the measured signal level of a reference cell. Examples of reference cell are serving cell, a cell whose signal level is at least above certain threshold (B3) etc. These cells (whose signal levels is above threshold (B1) or is B1 dB stronger than reference cell may be called herein as a set of potential cells (Sp) for cell change. The parameters B1, B2 and B3 can be pre-defined or configured by the network node.

The UE further determines traffic patterns only in one or more acceptable or suitable cells as described below. The UE may use one or more mechanisms described in embodiments above to determine the traffic pattern. In another example the UE may acquire the information about the traffic pattern in one or more cells by acquiring the SI of the cells e.g., whose signal level is above certain threshold. In this example (as described in examples in FIGS. 12-14 in embodiment) it is assumed that the target cell transmits traffic pattern information (e.g., via system information (SI)) to the UE indicating which one or more types of XR traffic can be supported by the base station in a cell or not for given time e.g., currently or for the next T6 time units (e.g., Y1 seconds, Y2 frames, Y3 SFN cycles etc.) starting from a reference time (e.g., current time, from certain SFN etc.)

The UE further compares the determined traffic pattern in one or more potential cells and compares it with one or more configured patterns e.g., configured ID. If the determined traffic pattern in a certain potential cell matches with any one of the configured traffic patterns, then this cell is considered as the acceptable or suitable cell for cell change. In another example if the status of the traffic pattern or type matching with any of the configured patterns is currently supported (e.g., status of traffic type with ID #0 in FIG. 13 is 1 and is also one of the configured pattern) then this cell is considered as the acceptable or suitable cell for cell change. Otherwise this cell is not considered to be acceptable or suitable cell for cell change. The UE may therefore create a new set of acceptable or suitable cells (Sa) for cell change.

The UE then transmits information about one or more cells in set Sa to the serving cell. The UE may further transmit information about the traffic patterns determined by the UE in cells in set Sa. For example, assume the UE determines cells with cell ID such as PCI1, #PCI2 and #PCI3 as potential cells for cell change i.e., Sp={PCI1, PCI2, PCI3}. The UE is configured with a traffic pattern ID: 1 and 2. The UE determines that only cell with PCI3 matches traffic pattern ID=2. Therefore, the UE signals {PCI3, pattern ID=2} to the serving cell. In another example the UE signals {RSRP3, PCI3, pattern ID=2} to the serving cell. In yet another example the UE signals {RSRQ3, RSRP3, PCI3, pattern ID=2} to the serving cell. RSRP3 and RSRQ3 are signal strength and signal quality measured by the UE in cell with PCI3.

The network node (e.g., serving cell) uses the received information for performing one or more tasks e.g., cell change of the UE to the suitable cell, network planning and tuning of parameters used for mobility such as layer-3 filtering coefficient for UE measurement, transmit power of BS etc. In another example, a network node can activate or deactivate the traffic pattern recognition for UE e.g., if UE reports several cells which support one of the configured patterns.

An essence of this inventive concept is a set of methods that enable a UE to recognize the pattern of periodic resource availability from a set of target cells and to report its preferred pattern ID in order for a network to choose the best target cell for XR handover.

The communication device 300 (implemented using the structure of the block diagram of FIG. 3) performs operations corresponding to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of flow charts in FIGS. 7-8.

Reference is now made to FIG. 7, which is a flow chart illustrating operations of a UE according to some embodiments of inventive concepts. Operations may include obtaining (702) a traffic pattern of a cell by measuring a signal of the cell and/or by receiving the information about the traffic pattern from the cell and using (704) the obtained traffic pattern of the cell for performing one or more operational tasks.

Some embodiments further include obtaining (706) the traffic pattern of a plurality of target cells to detect a periodic traffic pattern of the target cell. In some embodiments, the traffic pattern includes a periodic traffic pattern. The periodic pattern may be defined in a predetermined way and signaled by a radio resource control, RRC.

Operations may include determining (708) if the target cell has periodical resource availability based on a function of time instances of signal drop or rise and transmitting (710) information about the traffic pattern to a network node that is configured to perform a cell change responsive to the traffic pattern.

In some embodiments, the UE may transmit measured signal data to the network node to perform the cell change of the UE. In some embodiments, determining the traffic pattern includes monitoring signals including physical signals and/or physical channels including at least one of CSI-RS, time-frequency tracking signals, SSB, DMRS, PRS. Some embodiments provide that determining the traffic pattern may be performed using one or more signals transmitted by a neighbor cell during a certain duration. In some embodiments, determining the traffic pattern may be performed by periodically monitoring signal level of signals in a target cell and determining time instances at which the signal level drops below a predetermining threshold.

Some embodiments provide that determining the traffic pattern may be performed by determining statistical information corresponding to idle time and/or a time of low activity in a target cell when the UE can be served for XR traffic. In some embodiments, determining the traffic pattern comprises estimating statistical information corresponding to the idle interval in a cell when a UE can be served by that cell with XR traffic with acceptable quality after the cell change. Some embodiments provide that the statistical information comprises at least one of occurrence of the idle time, mean idle time, idle time variance, minimum idle time, and maximum idle time in a monitoring period.

In some embodiments, determining the traffic pattern includes monitoring one or more control and/or data channels that are transmitted by the target cell to its UEs and that the one or more control channels performs an allocation of resources to the UE. Some embodiments provide that, responsive to the UE detecting a presence of the control or data channel, the UE determines a high signal level or high activity level in that target cell and responsive to the UE not detecting presence of the control channel, the UE determines no or low signal level or low activity level in that target cell.

In some embodiments, operations include receiving (712) traffic pattern information from a target cell that broadcasts the traffic pattern information. In some embodiments, the traffic pattern information that is broadcast includes an identifier of traffic type and a traffic status. Some embodiments provide that the traffic pattern information that is broadcast comprises information that is transmitted by the network node in a broadcast channel, wherein the traffic pattern information is transmitted periodically or aperiodically.

Some embodiments provide that operations may include acquiring and reporting (714) a status of traffic type in a cell on which the UE performs a measurement. Operations may include acquiring and reporting (716) status of only specific traffic types in a cell for which the UE meet reporting condition. In some embodiments, using the obtained traffic pattern of the cell for performing one or more operational tasks includes transmitting information about the traffic pattern to a network node.

Reference is now made to FIG. 8, which is a flow chart illustrating operations of a UE according to some embodiments of inventive concepts. Operations include configuring (802) the UE to include information corresponding to one or more traffic patterns based on a configuration message received from a network node and/or based on pre-defined information, detecting (804) one or more cells and obtaining (806) a traffic pattern of the one or more cells by measuring a signal of the one or more detected cells and/or by receiving information about the traffic pattern from the one or more cells. Operation further include comparing (808) the determined traffic pattern in one or more detected cells with one or more configured patterns and using (810) the obtained information about the comparison of the traffic pattern for one or more operational tasks.

Some embodiments include determining that one or more target cells that are detected have a measured signal level that is above a given threshold. In some embodiments, the given threshold corresponds to a measured level of a reference cell. Some embodiments provide that the reference cell includes a serving cell having a signal level that is above the given threshold. In some embodiments, responsive to the determined traffic pattern in a potential cell matching any of the configured traffic patterns, operations include determining that the potential cell is suitable cell for cell change. Some embodiments provide that, responsive to a status of traffic pattern or a type matching configured patterns, then the potential cell is determined to be suitable for cell change.

Operations may include transmitting (812) the information about one or more cells corresponding to the traffic patterns to the network, the network being configured to use received information for performing one or more tasks. In some embodiments, the one or more tasks include at least one of performing a cell change of the UE to the suitable cell, network planning and tuning parameters for mobility including layer-3 filtering coefficient for UE measurement and/or a transmit power of a base station. Some embodiments provide that the pattern is a periodic traffic pattern.

Operations may include receiving (814) traffic pattern information from a target cell that broadcasts the traffic pattern information.

Operations may include determining (816) if the target cell has periodical resource availability based on a function of time instances of signal drop or rise and transmitting (818) information about the traffic pattern and/or comparison to a network node that is configured to perform a cell change responsive to the traffic pattern.

In some embodiments, operational tasks include transmitting information about the traffic pattern and/or comparison to a network node, transmitting information about the traffic pattern and/or comparison to a network node information about the traffic pattern to a network node that is configured to perform a cell change responsive to the traffic pattern, using information about the traffic pattern and/or comparison for performing cell change and storing information about the traffic pattern for using it at future time.

In some embodiments, the one or more cells whose traffic pattern is obtained is any of a neighbor cell, target cell, non-serving cell and a serving cell. Some embodiments provide that the serving cell is any of a special cell (SpCell), a primary cell (PCell), a primary secondary cell (PSCell) and a secondary cell (SCell).

The RAN node 400 (implemented using the structure of FIG. 4) performs operations corresponding to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow charts of FIGS. 9-10.

Reference is now made to FIG. 9, which is a flow chart illustrating operations of network node according to some embodiments of inventive concepts. Operations include receiving (902), from a user equipment, UE, traffic pattern information about a traffic pattern of a cell and performing (904) a cell change for the UE responsive to the traffic pattern. In some embodiments, the traffic pattern of the cell is obtained by measuring a signal of the cell and/or receiving the traffic pattern information from the cell.

Operations include receiving (906), from the UE, measured signal data to perform the cell change of the UE and broadcasting (908) traffic pattern information to the cell for measurement by the UE. In some embodiments, the traffic pattern information that is broadcast includes an identifier of traffic type and a traffic status. Some embodiments provide the traffic pattern information includes information that is transmitted by the network node in a broadcast channel, wherein the traffic pattern information is transmitted periodically or aperiodically.

Some embodiments include using the obtained traffic pattern of the cell for performing one or more operational tasks comprises transmitting information about the traffic pattern to a network node.

Reference is now made to FIG. 10, which is a flow chart illustrating operations of a network according to some embodiments of inventive concepts. Operations include transmitting (1002) a configuration message to a user equipment, UE, that includes information corresponding to one or more traffic patterns. In some embodiments, the traffic patterns are based on pre-defined information.

Operations may include using (1012) traffic pattern information for one or more operational tasks. In some embodiments, responsive to a determined traffic pattern in a potential cell matching any of the configured traffic patterns, determining that the potential cell is suitable cell for cell change. Some embodiments provide that, responsive a status of traffic pattern or a type matching configured patterns, then the potential cell is determined to be suitable for cell change.

In some embodiments, the one or more tasks includes at least one of performing a cell change of the UE to the suitable cell, network planning and tuning parameters for mobility including layer-3 filtering coefficient for UE measurement and/or a transmit power of a base station.

Example embodiments are discussed below.

Embodiment 1. A method of operating a user equipment, UE, in a communication network, the method comprising:
   obtaining a traffic pattern of a cell by measuring a signal of the cell and/or by receiving the information about the traffic pattern from the cell; and
   using the obtained traffic pattern of the cell for performing one or more operational tasks.

Embodiment 2. The method of embodiment 1, further comprising obtaining the traffic pattern of a plurality of target cells to detect a periodic traffic pattern of the target cell.

Embodiment 3. The method of any of embodiments 1-2, wherein the traffic pattern comprises a periodic traffic pattern.

Embodiment 4. The method of any of embodiments 1-3, further comprising:
   determining if the target cell has periodical resource availability based on a function of time instances of signal drop or rise; and
   transmitting information about the traffic pattern to a network node that is configured to perform a cell change responsive to the traffic pattern.

Embodiment 5. The method of any of embodiments 1-4, wherein the UE is further configured to transmit measured signal data to the network node to perform the cell change of the UE.

Embodiment 6. The method of any of embodiments 1-5, wherein the periodic pattern is defined in a predetermined way and signaled by a radio resource control, RRC.

Embodiment 7. The method of any of embodiments 1-6, wherein determining the traffic pattern comprises monitoring signals including physical signals and/or physical channels including at least one of CSI-RS, time-frequency tracking signals, SSB, DMRS, PRS.

Embodiment 8. The method of any of embodiments 1-7, wherein determining the traffic pattern may be performed using one or more signals transmitted by a neighbor cell during a certain duration.

Embodiment 9. The method of any of embodiments 1-8, wherein determining the traffic pattern may be performed by periodically monitoring signal level of signals in a target cell and determining time instances at which the signal level drops below a predetermining threshold.

Embodiment 10. The method of any of embodiments 1-9, wherein determining the traffic pattern may be performed by determining statistical information corresponding to idle time and/or a time of low activity in a target cell when the UE can be served for XR traffic.

Embodiment 11. The method of any of embodiments 1-10, wherein determining the traffic pattern comprises estimating statistical information corresponding to the idle interval in a cell when a UE can be served by that cell with XR traffic with acceptable quality after the cell change.

Embodiment 12. The method of any of embodiments 10-11, wherein the statistical information comprises at least one of occurrence of the idle time, mean idle time, idle time variance, minimum idle time, and maximum idle time in a monitoring period.

Embodiment 13. The method of any of embodiments 1-12, wherein determining the traffic pattern comprises monitoring one or more control and/or data channels that are transmitted by the target cell to its UEs, wherein the one or more control channels perform an allocation of resources to the UE, wherein responsive to the UE detecting a presence of the control or data channel the UE determines a high signal level or high activity level in that target cell, and wherein responsive to the UE not detecting presence of the control channel the UE determines no or low signal level or low activity level in that target cell.

Embodiment 14. The method of any of embodiments 1-13, further comprising receiving traffic pattern information from a target cell that broadcasts the traffic pattern information.

Embodiment 15. The method of embodiment 11, wherein the traffic pattern information that is broadcast comprises an identifier of traffic type and a traffic status.

Embodiment 16. The method of any of embodiments 14-15, wherein the traffic pattern information that is broadcast comprises information that is transmitted by the network node in a broadcast channel, wherein the traffic pattern information is transmitted periodically or aperiodically.

Embodiment 17. The method of any of embodiments 14-16, further comprising acquiring and reporting a status of traffic type in a cell on which the UE performs a measurement.

Embodiment 18. The method of any of embodiments 1-17, further comprising acquiring and reporting status of only specific traffic types in a cell for which the UE meet reporting condition.

Embodiment 19. The method of any of embodiments 1-18, wherein using the obtained traffic pattern of the cell for performing one or more operational tasks comprises transmitting information about the traffic pattern to a network node.

Embodiment 20. The method of any of embodiments 1-19, wherein using the obtained traffic pattern of the cell for performing one or more operational tasks comprises transmitting information about the traffic pattern to a network node information about the traffic pattern to a network node that is configured to perform a cell change responsive to the traffic pattern.

Embodiment 21. The method of any of embodiments 1-20, wherein using the obtained traffic pattern of the cell for performing one or more operational tasks comprises performing at least one of using information about the traffic pattern for performing cell change and storing information about the traffic pattern for using it at future time.

Embodiment 22. The method of any of embodiments 1-21, wherein the one or more cells whose traffic pattern is obtained is any of a neighbor cell, a target cell, a non-serving cell and a serving cell.

Embodiment 23. The method of embodiment 22, wherein the serving cell is any of: a special cell (SpCell), a primary cell (PCell), a primary secondary cell (PSCell) and a secondary cell (SCell).

Embodiment 24. A method of operating a user equipment, UE, in a communication network, the method comprising:

configuring the UE to include information corresponding to one or more traffic patterns based on a configuration message received from a network node and/or based on pre-defined information;

detecting one or more cells;

obtaining a traffic pattern of the one or more cells by measuring a signal of the one or more detected cells and/or by receiving information about the traffic pattern from the one or more cells;

comparing the determined traffic pattern in one or more detected cells with one or more configured patterns; and using the obtained information about the comparison of the traffic pattern for one or more operational tasks.

Embodiment 25. A method of embodiment 24, wherein determining that one or more target cells that are detected have a measured signal level that is above a given threshold.

Embodiment 26. The method of any of embodiments 24-25, wherein the given threshold corresponds to a measured level of a reference cell.

Embodiment 27. The method of embodiment 26, wherein the reference cell includes a serving cell having a signal level that is above the given threshold.

Embodiment 28. The method of any of embodiments 24-27, wherein responsive to the determined traffic pattern in a potential cell matching any of the configured traffic patterns, determining that the potential cell is suitable cell for cell change.

Embodiment 29. The method of any of embodiments 24-28, responsive to a status of traffic pattern or a type matching configured patterns, then the potential cell is determined to be suitable for cell change.

Embodiment 30. The method of any of embodiments 24-29, further comprising transmitting the information about one or more cells corresponding to the traffic patterns to the network, the network being configured to use received information for performing one or more tasks.

Embodiment 31. The method of any of embodiments 24-30, wherein the one or more tasks comprise at least one of performing a cell change of the UE to the suitable cell, network planning and tuning parameters for mobility including layer-3 filtering coefficient for UE measurement and/or a transmit power of a base station.

Embodiment 32. The method of any of embodiments 24 to 31, wherein the pattern is a periodic traffic pattern.

Embodiment 33. The method of any of embodiments 24 to 32, further comprising receiving traffic pattern information from a target cell that broadcasts the traffic pattern information.

Embodiment 34. The method of any of embodiments 24 to 33, further comprising:

determining if the target cell has periodical resource availability based on a function of time instances of signal drop or rise; and transmitting information about the traffic pattern and/or comparison to a network node that is configured to perform a cell change responsive to the traffic pattern.

Embodiment 35. The method of any of embodiments 24 to 34, wherein operational tasks comprising:

transmitting information about the traffic pattern and/or comparison to a network node;

transmitting information about the traffic pattern and/or comparison to a network node information about the traffic pattern to a network node that is configured to perform a cell change responsive to the traffic pattern;

using information about the traffic pattern and/or comparison for performing cell change; and storing information about the traffic pattern for using it at future time.

Embodiment 36. The method of any of embodiments 24 to 35, wherein the one or more cells whose traffic pattern is obtained is any of a neighbor cell, target cell, non-serving cell and a serving cell.

Embodiment 37. The method of embodiment 36, wherein the serving cell is any of:

a special cell (SpCell), a primary cell (PCell), a primary secondary cell (PSCell) and a secondary cell (SCell).

Embodiment 38. A method of operating a network node in a communication network, the method comprising:

receiving, from a user equipment, UE, traffic pattern information about a traffic pattern of a cell; and performing a cell change for the UE responsive to the traffic pattern, wherein the traffic pattern of the cell is obtained by measuring a signal of the cell and/or receiving the traffic pattern information from the cell.

Embodiment 39. The method of embodiment 38, further comprising receiving, from the UE, measured signal data to perform the cell change of the UE.

Embodiment 40. The method of any of embodiments 38-39, further comprising broadcasting traffic pattern information to the cell for measurement by the UE.

Embodiment 41. The method of embodiment 40, wherein the traffic pattern information that is broadcast comprises an identifier of traffic type and a traffic status.

Embodiment 42. The method of any of embodiments 38-41, wherein the traffic pattern information comprises information that is transmitted by the network node in a broadcast channel, wherein the traffic pattern information is transmitted periodically or aperiodically.

Embodiment 43. The method of any of embodiments 38-42, wherein using the obtained traffic pattern of the cell for performing one or more operational tasks comprises transmitting information about the traffic pattern to a network node.

Embodiment 44. A method of operating a network node in a communication network, the method comprising transmitting a configuration message to a user equipment, UE, that includes information corresponding to one or more traffic patterns.

Embodiment 45. A method of embodiment 44, wherein the traffic patterns are based on pre-defined information.

Embodiment 46. A method of any of embodiments 44-45, further comprising using traffic pattern information for one or more operational tasks.

Embodiment 47. The method of any of embodiments 44-46, wherein responsive to a determined traffic pattern in a potential cell matching any of the configured traffic patterns, determining that the potential cell is suitable cell for cell change.

Embodiment 48. The method of any of embodiments 44-47, responsive a status of traffic pattern or a type matching configured patterns, then the potential cell is determined to be suitable for cell change.

Embodiment 49. The method of any of embodiments 46-48, wherein the one or more tasks comprise at least one of performing a cell change of the UE to the suitable cell, network planning and tuning parameters for mobility including layer-3 filtering coefficient for UE measurement and/or a transmit power of a base station.

Embodiment 50. A communication device (300) comprising:

processing circuitry (303); and memory (305) coupled with the processing circuitry, wherein the memory includes instructions that when executed by the processing circuitry causes the communication device to perform operations according to any of Embodiments 1-37.

Embodiment 51. A communication device (300) adapted to perform according to any of Embodiments 1-37.

Embodiment 52. A computer program comprising program code to be executed by processing circuitry (303) of a communication device (300), whereby execution of the program code causes the communication device (300) to perform operations according to any of embodiments 1-37.

Embodiment 53. A computer program product comprising a non-transitory storage medium including program code to be executed by processing circuitry (303) of a communication device (300), whereby execution of the program code causes the communication device (300) to perform operations according to any of embodiments 1-37.

Embodiment 54. A radio access network, RAN, node (400) comprising: processing circuitry (403); and memory (405) coupled with the processing circuitry, wherein the memory includes instructions that when executed by the processing circuitry causes the RAN node to perform operations according to any of Embodiments 38-49.

Embodiment 55. A radio access network, RAN, node (400) adapted to perform according to any of Embodiments 38-49.

Embodiment 56. A computer program comprising program code to be executed by processing circuitry (403) of a radio access network, RAN, node (400), whereby execution of the program code causes the RAN node (400) to perform operations according to any of embodiments 38-49.

Embodiment 57. A computer program product comprising a non-transitory storage medium including program code to be executed by processing circuitry (403) of a radio access network, RAN, node (400), whereby execution of the program code causes the RAN node (400) to perform operations according to any of embodiments 38-49.

An essence of this inventive concept is a set of methods that enable a UE to recognize the pattern of periodic resource availability from a set of target cells and to report its preferred pattern ID in order for a network to choose the best target cell for XR handover.

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
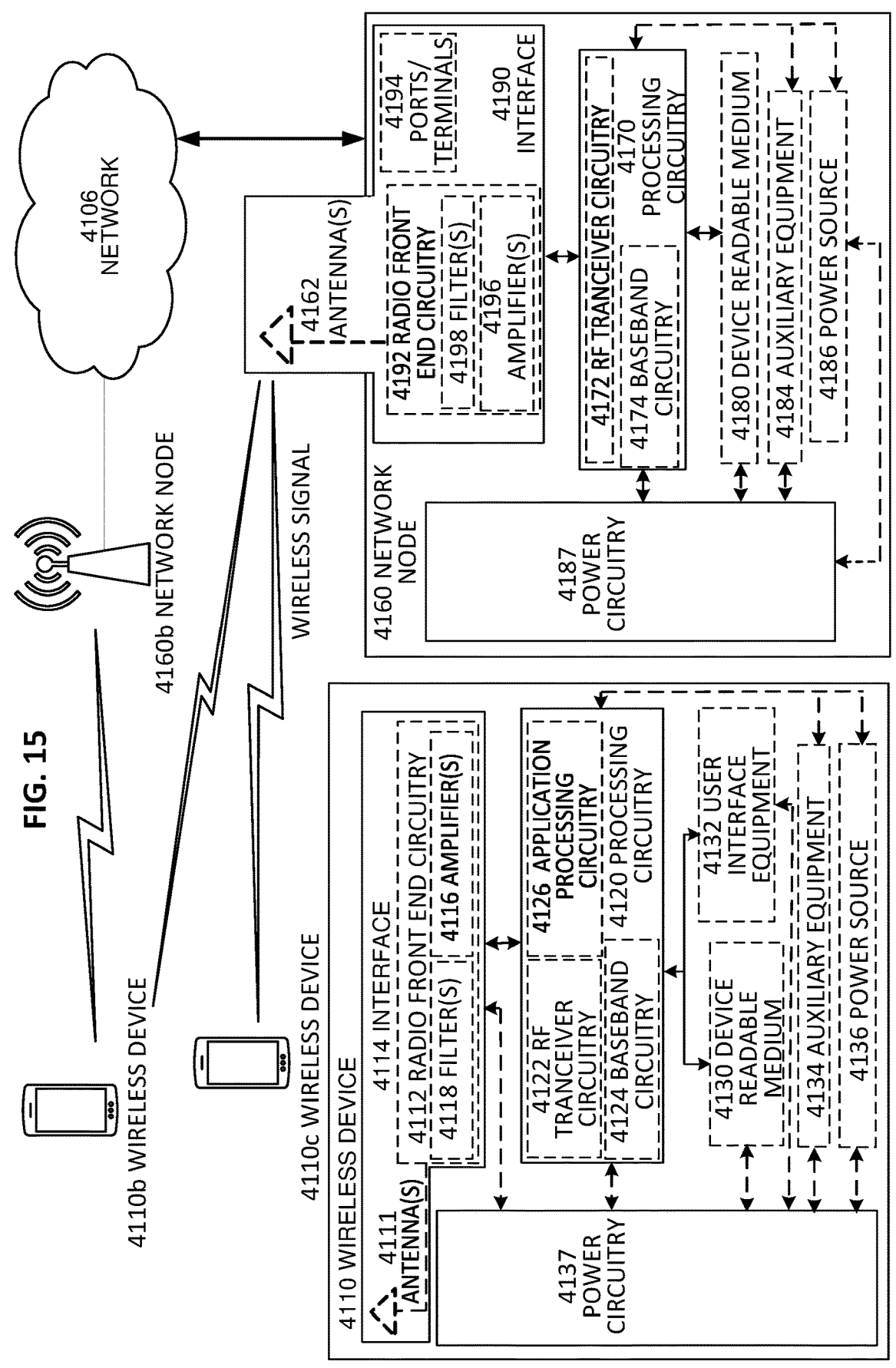
FIG. 15 is a block diagram of a wireless network in accordance with some embodiments.

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 15 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 16:
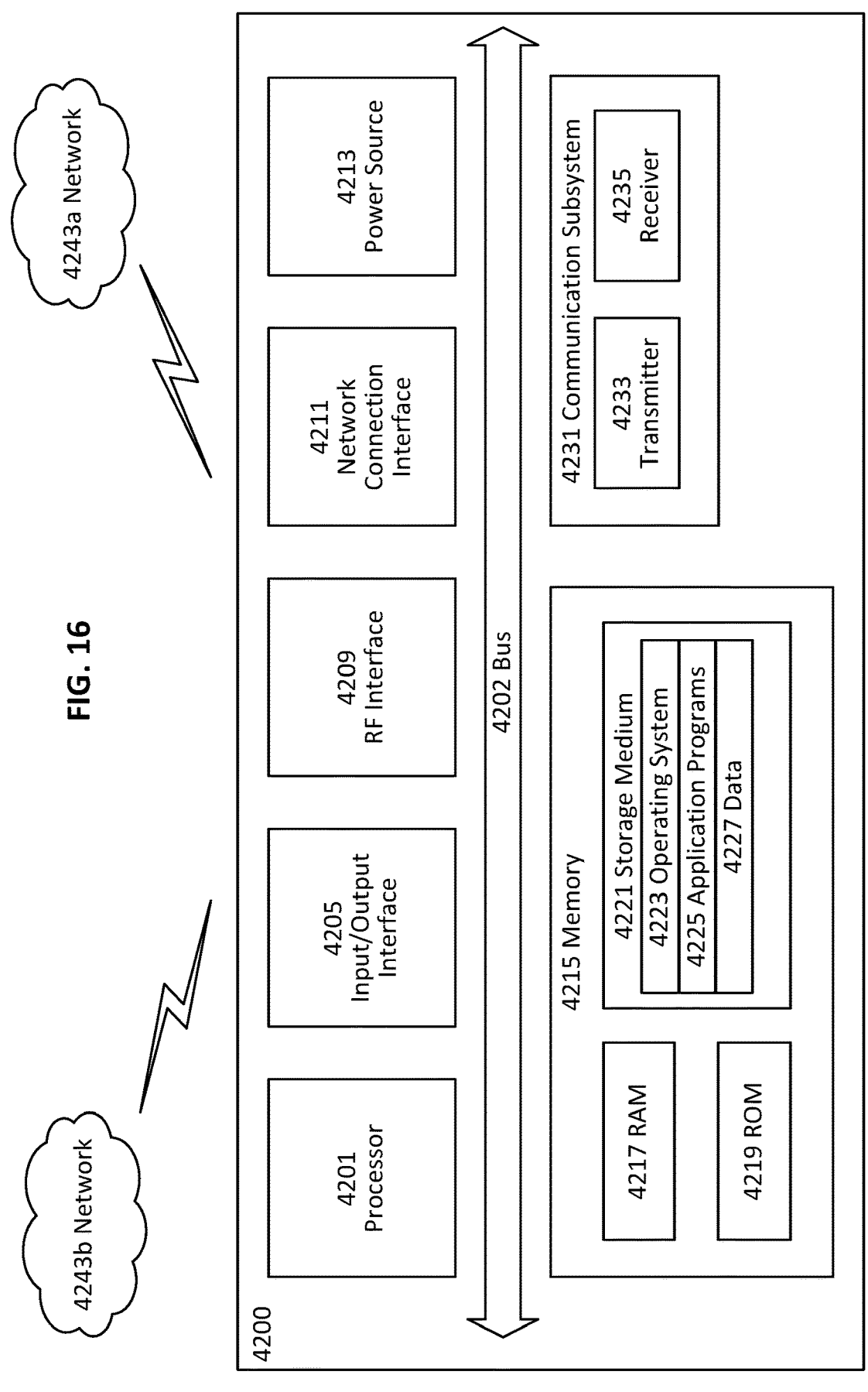
FIG. 16 is a block diagram of a user equipment in accordance with some embodiments

FIG. 16 illustrates a user Equipment in accordance with some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 16, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

FIG. 17 illustrates a virtualization environment in accordance with some embodiments.

FIG. 17 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 17, hardware 4330 may be a standalone network node with generic or specific components. Hardware 4330 may comprise antenna 43225 and may implement some functions via virtualization. Alternatively, hardware 4330 may be part of a larger cluster of hardware (e.g., such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 17.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 18:
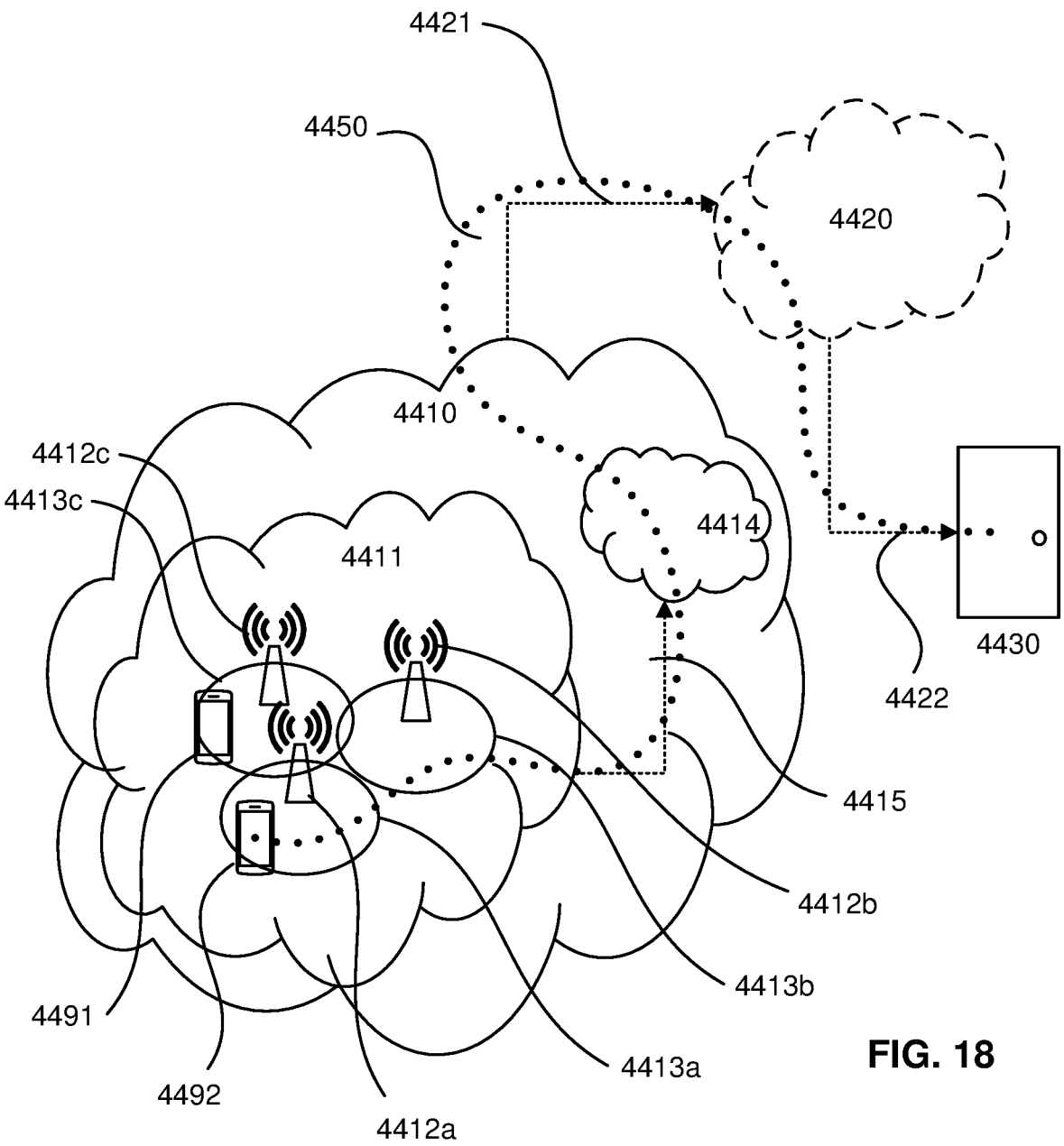
FIG. 18 is a block diagram of a telecommunication network connected via an intermediate network to a host computer in accordance with some embodiments.

FIG. 18 illustrates a telecommunication network connected via an intermediate network to a host computer in accordance with some embodiments.

With reference to FIG. 18, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 18 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 19:
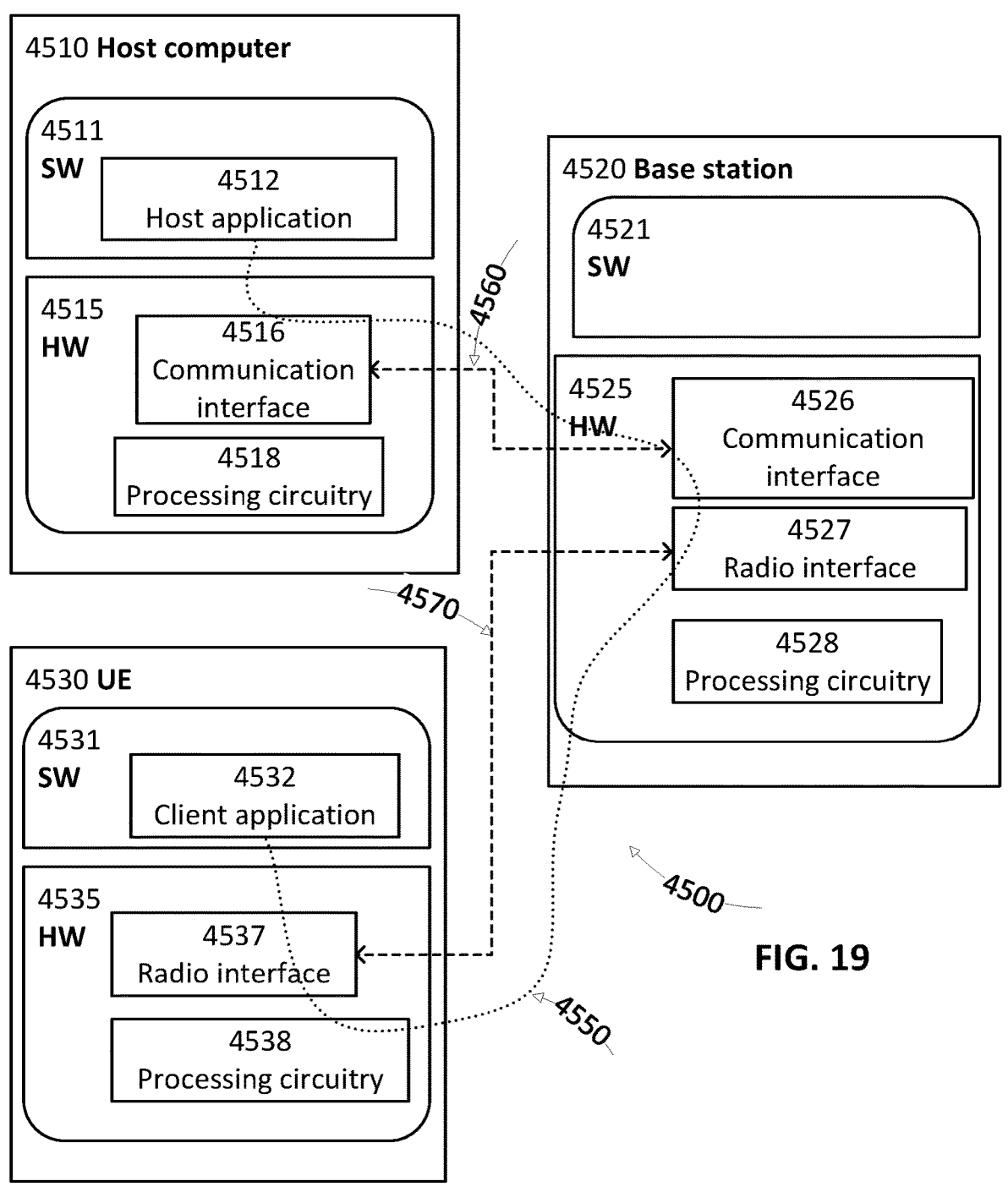
FIG. 19 is a block diagram of a host computer communicating via a base station with a user equipment over a partially wireless connection in accordance with some embodiments.

FIG. 19 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 19) served by base station 4520. Communication interface 4526 may be configured to facilitate connection 4560 to host computer 4510. Connection 4560 may be direct or it may pass through a core network (not shown in FIG. 19) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 19 may be similar or identical to host computer 4430, one of base stations 4412*a*, 4412*b*, 4412*c* and one of UEs 4491, 4492 of FIG. 18, respectively. This is to say, the inner workings of these entities may be as shown in FIG. 19 and independently, the surrounding network topology may be that of FIG. 18.

In FIG. 19, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 20, 21:
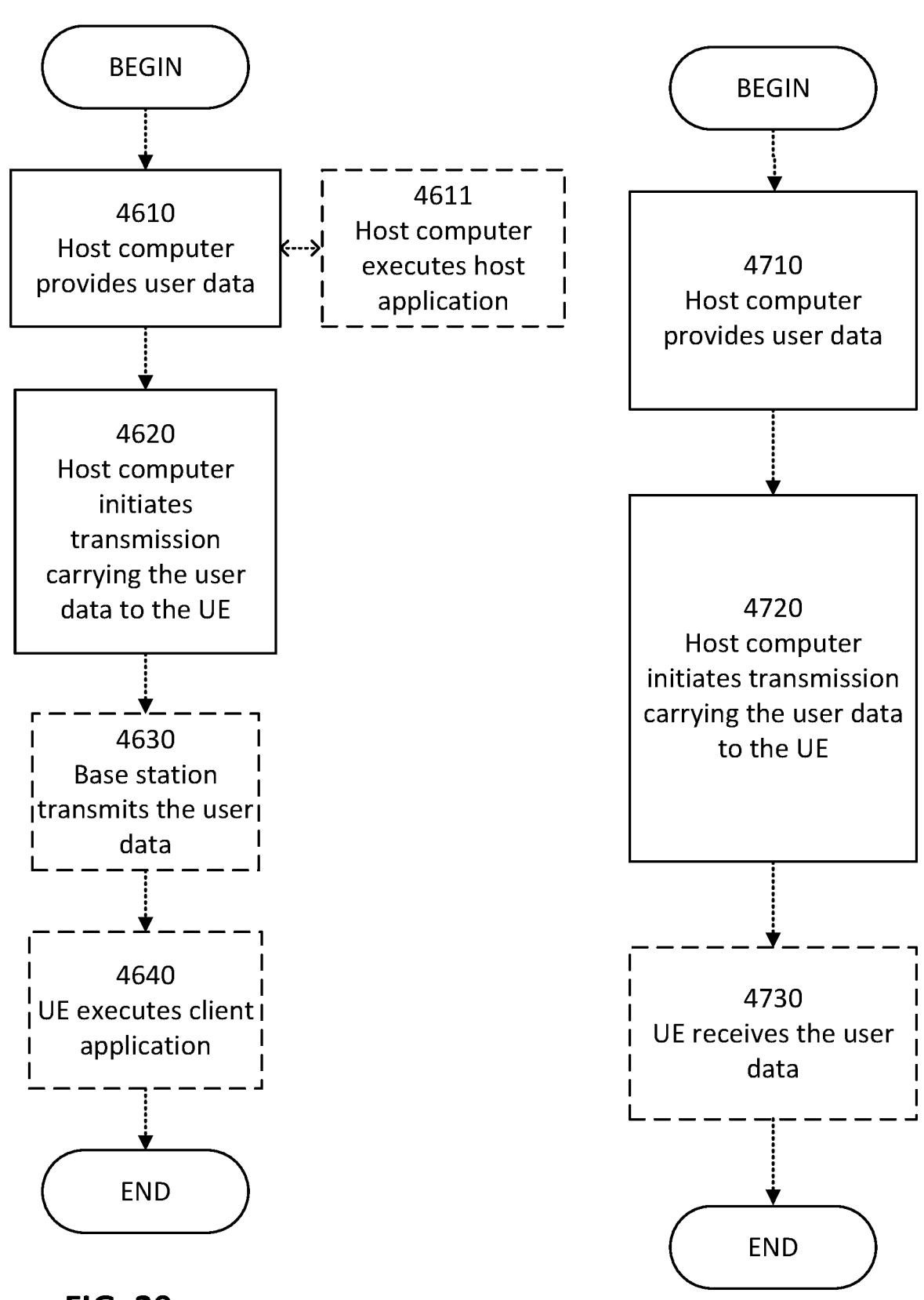
FIG. 20 is a block diagram of methods implemented in a communication system including a host computer, a base station and a user equipment in accordance with some embodiments.
FIG. 21 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 20 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 21 illustrates methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 21 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 22 illustrates methods implemented in a communication system including a host computer, a base station and a user equipment in accordance with some embodiments FIG. 22 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 22 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 23 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "I") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a user equipment, UE, in a communication network, the method comprising:
    obtaining a traffic pattern of a cell by measuring a signal of the cell and/or by receiving information about the traffic pattern from the cell; and
    using the obtained traffic pattern of the cell for performing one or more operational tasks,
    wherein obtaining the traffic pattern of the cell comprises determining statistical information corresponding to idle interval in the cell when the UE is capable of being served by the cell with extended reality, XR, traffic with acceptable quality after a cell change.

2. The method of claim 1,
    wherein obtaining the traffic pattern of the cell further comprises determining if the cell has periodical resource availability based on a function of time instances of signal drop or rise; and
    the method further comprising transmitting information about the traffic pattern of the cell to a network node that is configured to perform a cell change responsive to the traffic pattern of the cell.

3. The method of claim 2, wherein transmitting the information further comprises transmitting measured signal data to the network node to perform the cell change of the UE.

4. The method of claim 1, wherein obtaining the traffic pattern of the cell further comprises:

periodically monitoring signal level of signals in the cell; and determining time instances at which the signal level drops below a predetermining threshold.

5. The method of claim 1, wherein obtaining the traffic pattern of the cell further comprises determining the statistical information based on a time of low activity in the cell when the UE is capable of being served for the XR traffic.

6. The method of claim 1, wherein the statistical information comprises at least one of occurrence of the idle time, mean idle time, idle time variance, minimum idle time, and maximum idle time in a monitoring period.

7. The method of claim 1, wherein obtaining the traffic pattern further comprises:

monitoring one or more control and/or data channels that are transmitted by the cell to UEs, wherein the one or more control channels perform an allocation of resources to the UE, responsive to the UE detecting a presence of the control or data channel, determining a high signal level or high activity level in the cell, and responsive to the UE not detecting presence of the control channel for a period of time, determining no or low signal level or low activity level in the cell.

8. The method of claim 1, further comprising:

reporting status of only specific traffic types in the cell for which the UE determines a reporting condition is satisfied.

9. The method of claim 1, wherein using the obtained traffic pattern of the cell for performing one or more operational tasks comprises transmitting information about the traffic pattern to a network node.

10. A method of operating a user equipment, UE, in a communication network, the method comprising:

configuring the UE to include information corresponding to traffic pattern based on a configuration message received from a network node and/or based on predefined information;

detecting a cell;

obtaining a traffic pattern of the cell based on estimating statistical information corresponding to an idle interval in the cell when the UE is capable of being served by the cell with extended reality (XR) traffic with acceptable quality after a cell change;

comparing the obtained traffic pattern of the cell with one or more configured patterns; and using information obtained from the comparison for one or more operational tasks.

11. The method of claim 10, wherein using the obtained information further comprises:

responsive to the obtained traffic pattern in the cell matching one of the one or more configured traffic patterns, determining that the cell is suitable cell for cell change.

12. The method of claim 10, wherein using the obtained information further comprises:

responsive to a status of the traffic pattern or a type of the traffic pattern matching one of the one or more configured traffic patterns, determining that the cell is suitable cell for cell change.

13. The method of claim 10, further comprising:

transmitting the information obtained from the comparison to the network node configured to use the information for performing one or more tasks.

14. The method of claim 10, further comprising:

based on determining the cell has periodical resource availability based on a function of time instances of signal drop or rise, transmitting the information obtained from the comparison to the network node that is configured to perform a cell change.

15. The method of claim 10, wherein using the information obtained from the comparison comprises at least one of:

transmitting information about the traffic pattern and/or the information obtained from the comparison to the network node; and using information about the traffic pattern and/or the information obtained from the comparison for performing cell change.

16. A method of operating a network node in a communication network, the method comprising:

receiving, from a user equipment, UE, traffic pattern information about a traffic pattern of a cell;

obtaining from the traffic pattern information statistical information corresponding to an idle interval in the cell when the UE is capable of being served by the cell with extended reality (XR) traffic with acceptable quality after a cell change; and performing a cell change for the UE responsive to the statistical information.

17. The method of claim 16, further comprising:

receiving, from the UE, measured signal data to perform the cell change of the UE.

18. The method of claim 16, further comprising:

broadcasting traffic pattern information to the cell for measurement by the UE.

19. The method of claim 18, wherein the traffic pattern information that is broadcast comprises an identifier of traffic type and a traffic status.

20. The method of claim 16, wherein the traffic pattern information comprises information that is transmitted by the network node in a broadcast channel, wherein the traffic pattern information is transmitted periodically or aperiodically.

\* \* \* \* \*